United States Patent
Young et al.

(10) Patent No.: US 12,480,639 B2
(45) Date of Patent: *Nov. 25, 2025

(54) AREA LIGHT

(71) Applicant: Black & Decker Inc., New Britain, CT (US)

(72) Inventors: Crystal G. Young, Towson, MD (US); James B. Watson, Baltimore, MD (US); Gabriel E. Concari, Eldersburg, MD (US); Jesse P. Hill, Baltimore, MD (US); Keith Moore, Towson, MD (US); Geoffrey S. Howard, Columbia, MD (US); Jonathan Kirkpatrick, Baldwin, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/312,680

(22) Filed: May 5, 2023

(65) Prior Publication Data

US 2023/0272901 A1 Aug. 31, 2023

Related U.S. Application Data

(63) Continuation of application No. 17/083,377, filed on Oct. 29, 2020, now Pat. No. 11,686,454, which is a
(Continued)

(51) Int. Cl.
*F21V 15/01* (2006.01)
*F21L 2/00* (2006.01)
(Continued)

(52) U.S. Cl.
CPC ............... *F21V 15/01* (2013.01); *F21L 2/00* (2013.01); *F21L 4/00* (2013.01); *F21L 4/02* (2013.01);
(Continued)

(58) Field of Classification Search
CPC ...... F21W 2131/1005; F21W 2131/402; F21S 6/005; F21V 29/77; F21V 29/83;
(Continued)

(56) References Cited

U.S. PATENT DOCUMENTS

D56,014 S    8/1920   Lumley
1,474,401 A  11/1923  Bramley
(Continued)

FOREIGN PATENT DOCUMENTS

DE        2602862 A     7/1977
DE    202007005003 U1   7/2007
(Continued)

OTHER PUBLICATIONS

EP Search Report dated Jul. 15, 2016.

*Primary Examiner* — Colin J Cattanach
(74) *Attorney, Agent, or Firm* — Womble Bond Dickinson (US) LLP

(57) ABSTRACT

An area light is provided including a housing defining a central axis having a first end, a second end opposite the first end, and a side portion; a cover mounted on the first end of the housing; a light module disposed on the first end of the housing, the light module comprising a heat sink and at least one light-emitting diode (LED) to emit light through the cover and in a direction that extends 360 degrees around the center axis; and a battery receptacle disposed on the side portion of the housing to receive a removable battery pack and supply electric power form the removable battery pack to the at least one LED. At least one hook is provided on or adjacent the first end of the housing.

20 Claims, 12 Drawing Sheets

Related U.S. Application Data continuation of application No. 16/276,218, filed on Feb. 14, 2019, now abandoned, which is a continuation of application No. 15/165,060, filed on May 26, 2016, now abandoned.

(60) Provisional application No. 62/249,517, filed on Nov. 2, 2015, provisional application No. 62/168,477, filed on May 29, 2015.

(51) Int. Cl.

| | | |
|---|---|---|
| F21L 4/00 | (2006.01) | |
| F21L 4/02 | (2006.01) | |
| F21L 4/08 | (2006.01) | |
| F21V 23/00 | (2015.01) | |
| F21V 23/02 | (2006.01) | |
| F21V 23/04 | (2006.01) | |
| F21V 29/77 | (2015.01) | |
| F21W 131/10 | (2006.01) | |
| F21W 131/402 | (2006.01) | |
| F21Y 101/00 | (2016.01) | |
| F21Y 107/30 | (2016.01) | |
| F21Y 107/40 | (2016.01) | |
| F21Y 107/50 | (2016.01) | |
| F21Y 115/10 | (2016.01) | |
| H05B 45/10 | (2020.01) | |
| H05B 47/175 | (2020.01) | |
| H05B 47/19 | (2020.01) | |
| H05B 47/195 | (2020.01) | |
| F21S 6/00 | (2006.01) | |
| F21V 21/40 | (2006.01) | |
| F21V 29/83 | (2015.01) | |
| F21Y 107/20 | (2016.01) | |
| F21Y 107/90 | (2016.01) | |

(52) U.S. Cl.
CPC .............. *F21L 4/08* (2013.01); *F21V 23/02* (2013.01); *F21V 23/0435* (2013.01); *H05B 45/10* (2020.01); *H05B 47/19* (2020.01); *F21S 6/005* (2013.01); *F21V 21/40* (2013.01); *F21V 21/406* (2013.01); *F21V 23/009* (2013.01); *F21V 29/77* (2015.01); *F21V 29/83* (2015.01); *F21W 2131/1005* (2013.01); *F21W 2131/402* (2013.01); *F21Y 2101/00* (2013.01); *F21Y 2107/20* (2016.08); *F21Y 2107/30* (2016.08); *F21Y 2107/40* (2016.08); *F21Y 2107/50* (2016.08); *F21Y 2107/90* (2016.08); *F21Y 2115/10* (2016.08); *H05B 47/195* (2020.01); *H05B 47/196* (2024.01); *H05B 47/1965* (2024.01)

(58) Field of Classification Search
CPC .................. F21V 21/40; F21V 21/406; F21V 29/74–777; F21Y 2107/20; F21Y 2107/30; F21Y 2107/40; F21Y 2107/50; F21Y 2107/90
See application file for complete search history.

(56) References Cited

U.S. PATENT DOCUMENTS

| | | |
|---|---|---|
| D84,077 S | 5/1931 | Graff |
| D277,739 S | 2/1985 | Grammas et al. |
| 5,192,126 A | 3/1993 | Remeyer et al. |
| 5,294,924 A | 3/1994 | Dydzyk |
| 5,630,660 A | 5/1997 | Chen |
| 5,890,794 A | 4/1999 | Abtahi |
| D411,810 S | 7/1999 | Stockman |
| 6,425,678 B1 | 7/2002 | Verdes et al. |
| 6,549,121 B2 | 4/2003 | Povey et al. |
| 6,558,068 B1 | 5/2003 | Wittig |
| 6,766,760 B2 | 7/2004 | Garcia |
| 6,769,380 B1 | 8/2004 | Carvajalino et al. |
| 6,857,756 B2 | 2/2005 | Reiff et al. |
| 6,979,100 B2 | 12/2005 | Reiff et al. |
| 7,014,337 B2 | 3/2006 | Chen |
| D581,304 S | 11/2008 | Phillips |
| D592,088 S | 5/2009 | Miller |
| 7,621,652 B2 | 11/2009 | Zick |
| 7,682,036 B2 | 3/2010 | Reiff et al. |
| 7,782,223 B2 | 8/2010 | Lang et al. |
| 7,810,968 B1 | 10/2010 | Walker |
| 7,878,678 B1 | 2/2011 | Stamatatos et al. |
| 8,025,418 B2 | 9/2011 | Zick |
| 8,033,685 B2 | 10/2011 | Mcgehee et al. |
| D669,806 S | 10/2012 | Stein |
| D669,807 S | 10/2012 | Stein |
| 8,587,453 B2 | 11/2013 | Cripps |
| D700,859 S | 3/2014 | Neubert |
| 8,851,706 B2 | 10/2014 | Alsaffar |
| 9,035,786 B2 | 5/2015 | Clifford et al. |
| 9,062,875 B2 | 6/2015 | Neal |
| 9,091,402 B2 | 7/2015 | Weber et al. |
| D737,712 S | 9/2015 | Dack et al. |
| 9,316,384 B2 | 4/2016 | Mumma et al. |
| 9,437,109 B1 | 9/2016 | Stafford |
| 9,493,919 B2 | 11/2016 | Handy et al. |
| 9,591,727 B2 | 3/2017 | Kim et al. |
| 9,851,088 B2 | 12/2017 | Harvey |
| 2001/0038339 A1 | 11/2001 | McKenzie |
| 2003/0132852 A1 | 7/2003 | Povey et al. |
| 2004/0201989 A1 | 10/2004 | Raskas |
| 2006/0132323 A1 | 6/2006 | Grady, Jr. |
| 2006/0204328 A1 | 9/2006 | Frey |
| 2007/0222640 A1 | 9/2007 | Guelzow, II et al. |
| 2007/0223236 A1* | 9/2007 | Thompson .......... F16M 11/2078 362/382 |
| 2008/0036584 A1 | 2/2008 | Lang |
| 2008/0106430 A1 | 5/2008 | Yeh |
| 2009/0097241 A1 | 4/2009 | Xu et al. |
| 2009/0284963 A1 | 11/2009 | Intravatola |
| 2010/0027249 A1 | 2/2010 | Connor |
| 2010/0033969 A1 | 2/2010 | Hochstein |
| 2010/0141153 A1 | 6/2010 | Recker et al. |
| 2010/0321934 A1 | 12/2010 | Mcdermott |
| 2011/0058361 A1 | 3/2011 | Houghton |
| 2011/0249430 A1 | 10/2011 | Stamatatos et al. |
| 2011/0291617 A1 | 12/2011 | Rosenbecker et al. |
| 2012/0026726 A1 | 2/2012 | Recker et al. |
| 2012/0026727 A1 | 2/2012 | Hajee et al. |
| 2012/0080944 A1 | 4/2012 | Recker et al. |
| 2012/0287611 A1 | 11/2012 | Wilson et al. |
| 2012/0300444 A1 | 11/2012 | Gibson et al. |
| 2013/0002687 A1 | 1/2013 | Conti et al. |
| 2013/0063042 A1 | 3/2013 | Bora et al. |
| 2013/0241419 A1 | 9/2013 | Gafoori |
| 2013/0258645 A1 | 10/2013 | Weber |
| 2013/0265780 A1 | 10/2013 | Choksi et al. |
| 2014/0043800 A1 | 2/2014 | Weber |
| 2014/0071681 A1 | 3/2014 | Gafoori |
| 2014/0126187 A1 | 5/2014 | Bennett et al. |
| 2014/0268733 A1 | 9/2014 | Holland et al. |
| 2014/0293592 A1 | 10/2014 | Hopper |
| 2014/0307443 A1 | 10/2014 | Clifford et al. |
| 2014/0321106 A1 | 10/2014 | Workman et al. |
| 2015/0008845 A1 | 1/2015 | Kim et al. |
| 2015/0102731 A1 | 4/2015 | Altamura et al. |
| 2015/0159844 A1 | 6/2015 | Flaherty et al. |
| 2015/0337507 A1 | 11/2015 | Handy |
| 2015/0351204 A1 | 12/2015 | Hershberg et al. |
| 2015/0366039 A1 | 12/2015 | Noori et al. |
| 2016/0035217 A1 | 2/2016 | Camden et al. |
| 2016/0135271 A1 | 5/2016 | Alexander |
| 2016/0197502 A1 | 7/2016 | Waters et al. |
| 2016/0223185 A1 | 8/2016 | Harvey |
| 2016/0312967 A1 | 10/2016 | Harvey |
| 2016/0321921 A1 | 11/2016 | Stafford et al. |

(56) References Cited

U.S. PATENT DOCUMENTS

| | | |
|---|---|---|
| 2016/0342151 A1 | 11/2016 | Dey, IV et al. |
| 2016/0360598 A1 | 12/2016 | Negatu |
| 2016/0366754 A1 | 12/2016 | Villaume |
| 2016/0373457 A1 | 12/2016 | Matson et al. |
| 2017/0016612 A1 | 1/2017 | Boyd |
| 2017/0071045 A1 | 3/2017 | Harvey et al. |
| 2017/0123390 A1 | 5/2017 | Barco et al. |
| 2017/0127501 A1 | 5/2017 | Isaacs et al. |
| 2017/0163439 A1 | 6/2017 | Bosua et al. |
| 2017/0211763 A1* | 7/2017 | Daubenspeck ......... F21V 5/045 |
| 2017/0325324 A1 | 11/2017 | Kwag et al. |
| 2019/0274206 A1 | 9/2019 | Altamura et al. |

FOREIGN PATENT DOCUMENTS

| | | |
|---|---|---|
| EP | 0330392 | 8/1989 |
| EP | 1004815 A2 | 5/2000 |
| ES | 2101617 A1 | 7/1997 |
| GB | 2347162 | 8/2000 |
| KR | 20130140349 A | 12/2013 |
| WO | 2010010070 A1 | 1/2010 |
| WO | 2011065705 A2 | 6/2011 |
| WO | 2013047929 A1 | 4/2013 |

\* cited by examiner

AREA LIGHT

CROSS-REFERENCE TO RELATED APPLICATION

This patent application is a continuation of U.S. patent application Ser. No. 17/083,377 titled "Area Light" filed Oct. 28, 2020, which is a continuation of U.S. patent application Ser. No. 16/276,218 titled "Wirelessly-Controlled Lighting Device" filed Feb. 14, 2019, which is a continuation of U.S. patent application Ser. No. 15/165,060 titled "Work Light," filed May 26, 2016, which claims the benefit of U.S. Provisional Application No. 62/146,576 titled "Work Light," filed May 29, 2015, and U.S. Provisional Application No. 62/249,517 titled "Work Light," filed Nov. 2, 2015, contents of all of which are incorporated herein by reference in their entireties.

FIELD

This application relates to an area light.

BACKGROUND

Work lights capable of illuminating large construction jobsite are important, particularly during early phases of commercial construction jobsite activities, when sources and distribution of electrical power is limited. In addition, storage of work lights is often a problem in construction sites. What is needed is a work light capable of illuminating large areas that provides efficient storagability and flexibility to work with various sources of electrical power.

Additionally, in large work sites, management and control of work lights positioned at different locations throughout the work site is difficult. What is needed is an effective centralized mechanism for management of the work lights.

SUMMARY

According to an embodiment of the invention, a lighting apparatus is provided composing: a base portion defining an axial opening; a main portion located above the base portion and having a generally-cylindrical upper portion; and a light module secured to a top portion of the generally-cylindrical upper portion of the main portion. In an embodiment, the axial opening of the base portion is sized to receive at least a light module of another lighting apparatus therein in a stacked position.

In an embodiment, the base portion includes a generally-cylindrical body having four legs formed around the axial opening.

In an embodiment, the generally-cylindrical upper body of the main portion includes a smaller diameter than the axial opening of the base portion.

In an embodiment, the main portion further includes a control housing portion housing a control circuit configured to control an operation of the lighting module. In an embodiment, the main portion further includes a keypad, a battery receptacle, and an AC plug. In an embodiment, the control circuit includes an AC-to-DC converter to convert AC power from the AC plug to DC power to power the light module. In an embodiment, the control circuit is configured to supply electric power from a battery pack plugged into the battery receptacle when no AC power is detected from the AC plug. In an embodiment, the control circuit is configured to control at least one of a luminance intensity or light direction of the light module based on an input from the keypad.

In an embodiment, the main portion further includes two housing halves mated together around at least a lower portion of the main portion and mounted on the base portion, the axial opening extending between the two housing halves.

In an embodiment, each housing half includes radial ribs projecting inwardly from an inner surface therein around the axial opening. In an embodiment, the radial ribs include at least a first rib defining a first diameter of the axial opening corresponding to a diameter of the light module, and at least a second rib defining a second diameter of the axial opening corresponding to a diameter of the upper portion of the main portion. In an embodiment, the first rib is located around the light module of another light apparatus and the second rib located around the upper portion of the main portion of the other light apparatus in the stacked position.

In an embodiment, the light module includes a transparent cover, a generally-cylindrical heat sink mounted on the upper portion of the main body, and vertically-elongated printed circuit boards (PCBs) arranged on an outer circumference of the heat sink, and light-emitting devices (LEDs) mounted to each of the PCBs.

In another aspect of the invention, according to an embodiment, a lighting apparatus is provided, comprising: a light module; a wireless communication unit configured to communicate wirelessly with a computing device; and a controller configured to receive a control signal associated with at least one of a luminance intensity or lighting direction of the light module from the computing device via the wireless communication unit and a control the luminance intensity or lighting direction of the lighting module based on the control signal.

In an embodiment, the wireless communication unit is configure to connect wirelessly to the computing device after a user's selection of the light apparatus from a list of available light apparatuses displayed to the user.

In an embodiment, the controller is further configured to receive an on/off signal associated with enabling or disabling the light apparatus from the computing device via the wireless communication unit and turn the light module on or off accordingly.

In an embodiment, the controller is further configured to supply the computing device a status signal indicative of the power level of a battery pack coupled to the light apparatus via the wireless communication unit.

In another aspect of the invention, according to an embodiment, a system is provided, comprising: at least one lighting apparatus having a light module, a wireless communication unit, and a controller configured to control a lighting operation of the light module; and a separate computing device for communicating wirelessly with the at least one lighting apparatus. In an embodiment, the controller is configured to receive a control signal associated with at least one of a luminance intensity or lighting direction of the light module from the computing device via the wireless communication unit and control the luminance intensity or lighting direction of the lighting module based on the control signal.

In an embodiment, the computing device is configured to provide a display interface including a listing of the at least one lighting apparatus and receive a user selection of the at least one lighting apparatus.

In an embodiment, the computing device is configured to provide a display interface associated with the at least one lighting apparatus.

In an embodiment, the computing device is configured to receive a user selection of an action associated with at least one of the luminance intensity or lighting direction of the light module from the user and communicate the at least one of the luminance intensity of lighting direction to the controller via the wireless communication unit.

In an embodiment, the computing device is configured to receive a schedule associated with a lighting control of the at least one lighting apparatus and communicate the schedule to the controller via the wireless communication unit.

In an embodiment, the controller is configured to control at least one of an on/off function, the luminance intensity or the lighting direction of the light module based on the schedule.

BRIEF DESCRIPTION OF THE DRAWINGS

In the accompanying drawings which form part of the specification:

Figures 9A, 9B:
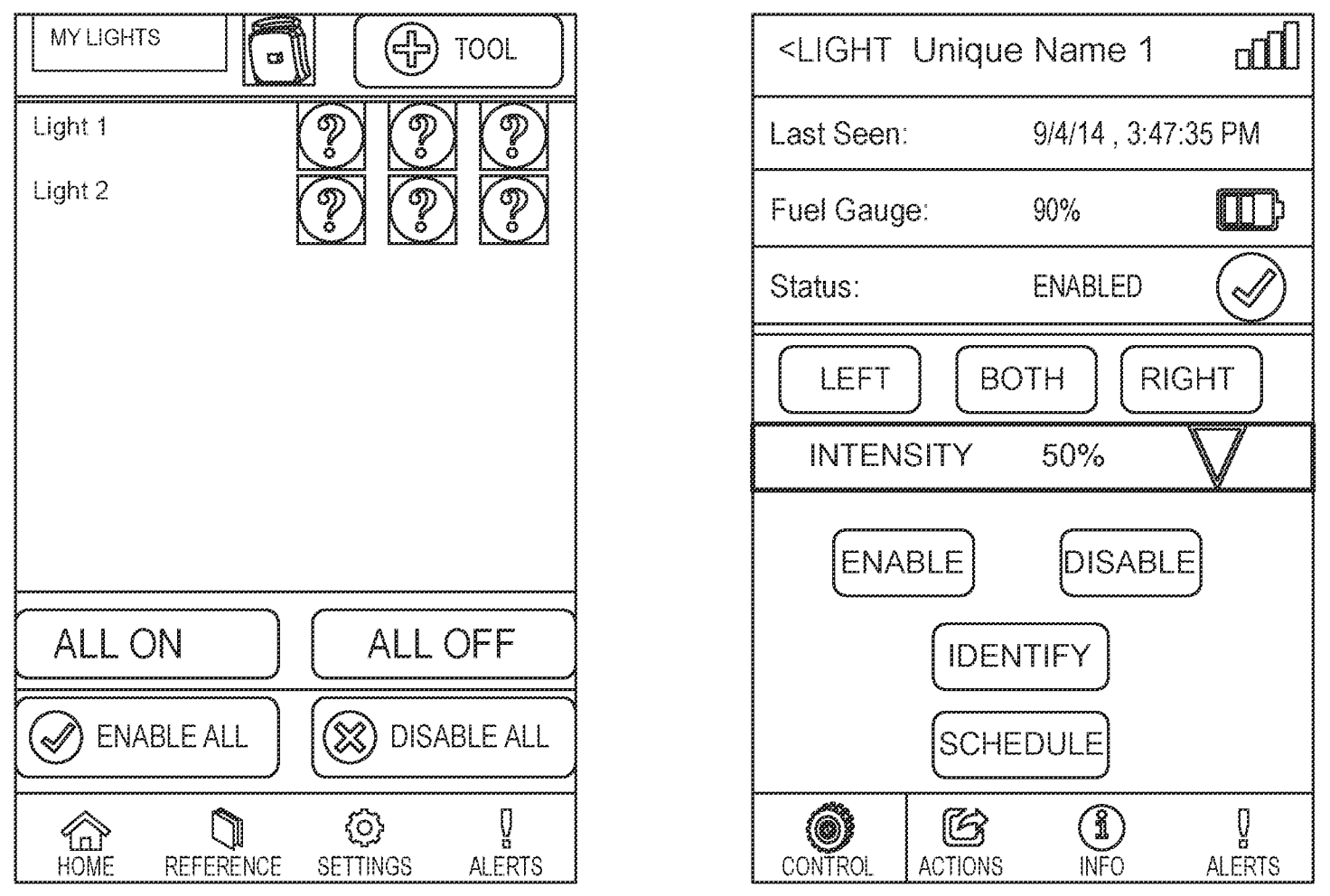

FIGS. 9A and 9B depict graphical user interfaces displayed on the computing device for controlling one or more work lights, according to an embodiment.

Corresponding reference numerals indicate corresponding parts throughout the several figures of the drawings.

DESCRIPTION

Figure 1:
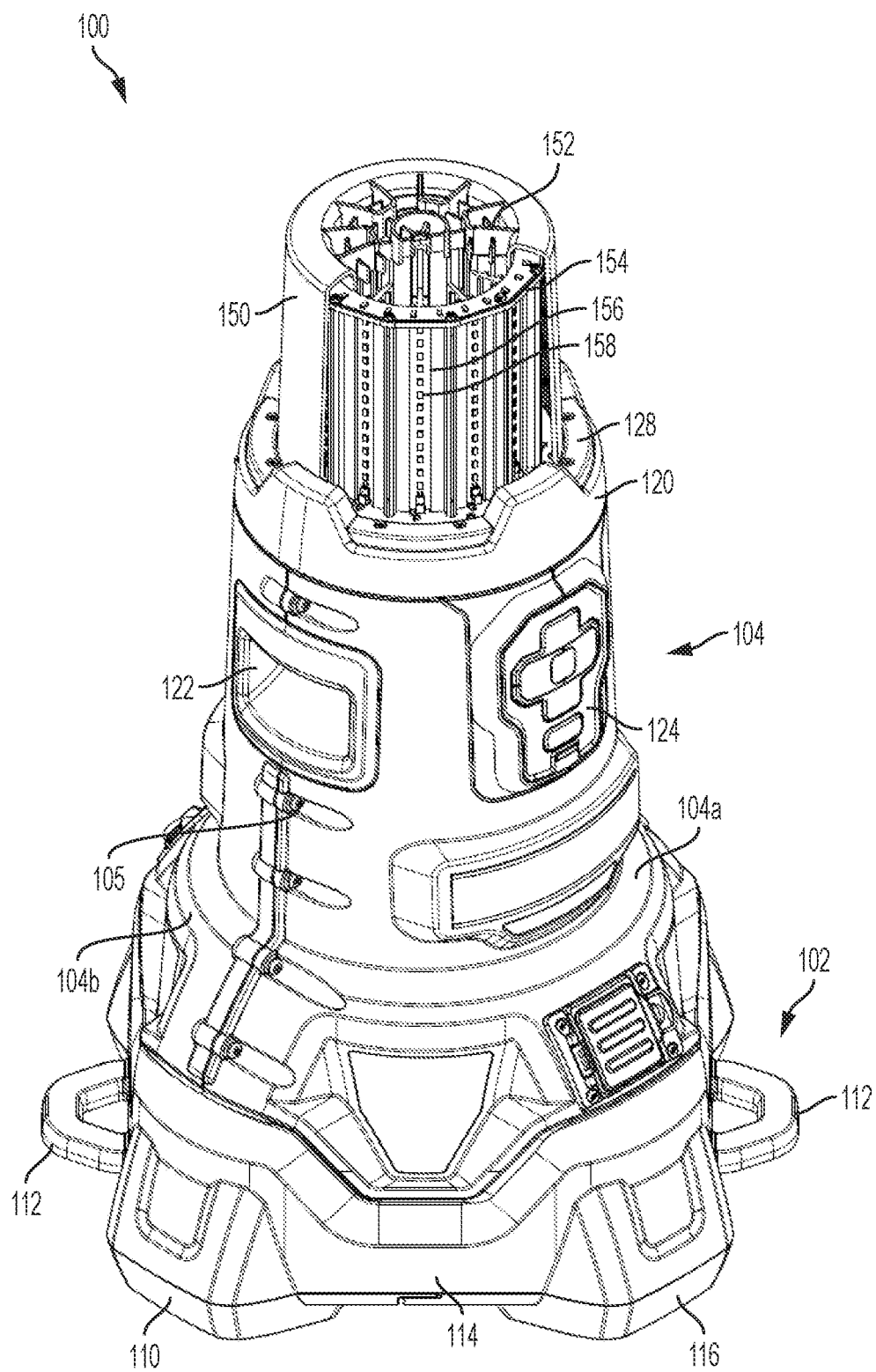
FIG. 1 depicts a perspective view of a work light, according to an embodiment.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Figure 2:
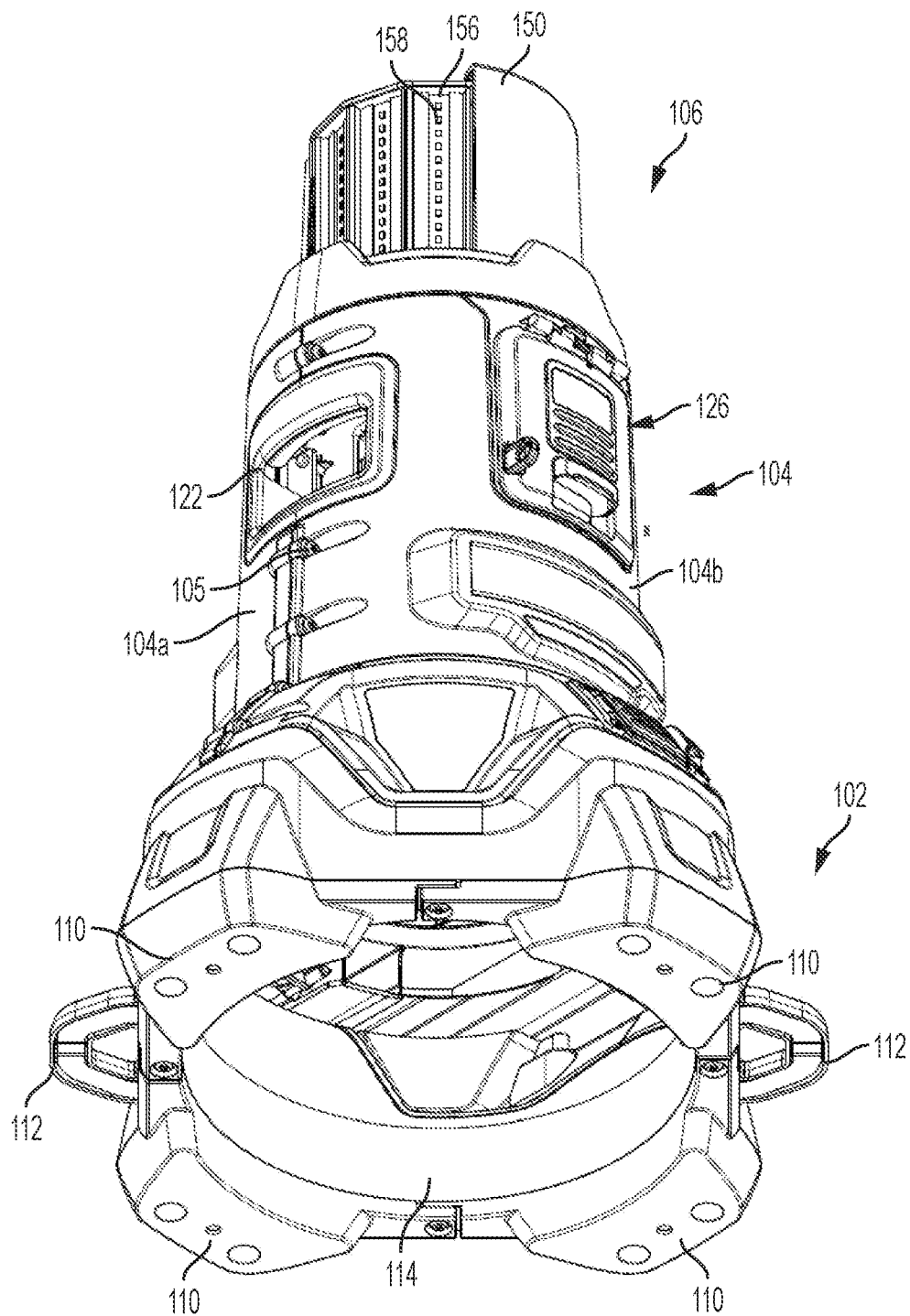
FIG. 2 depicts another perspective view of the work light, according to an embodiment.
Figure 3A:
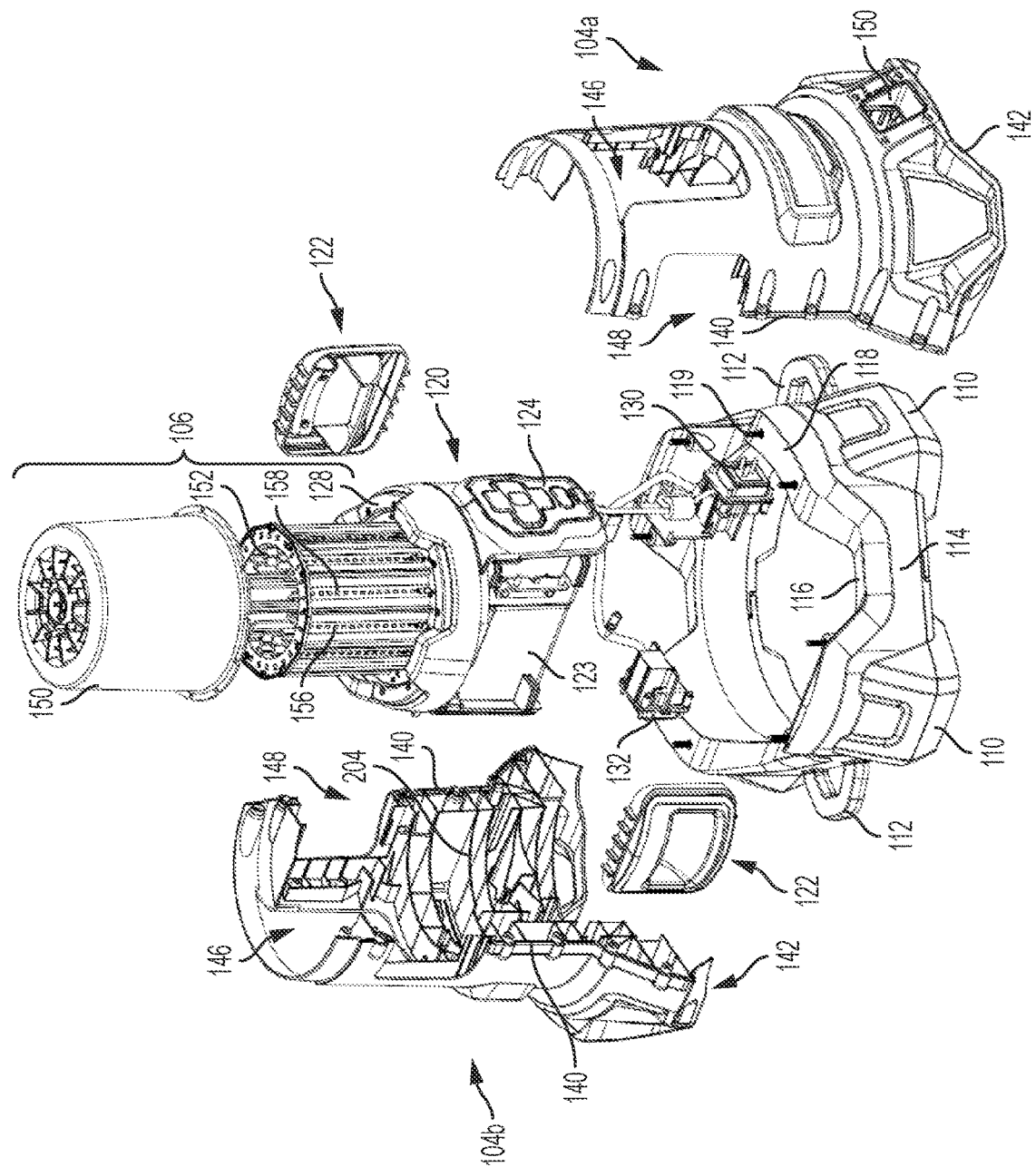
FIGS. 3A and 3B depict front and rear exploded perspective views of the work light, according to an embodiment.
Figure 3B:
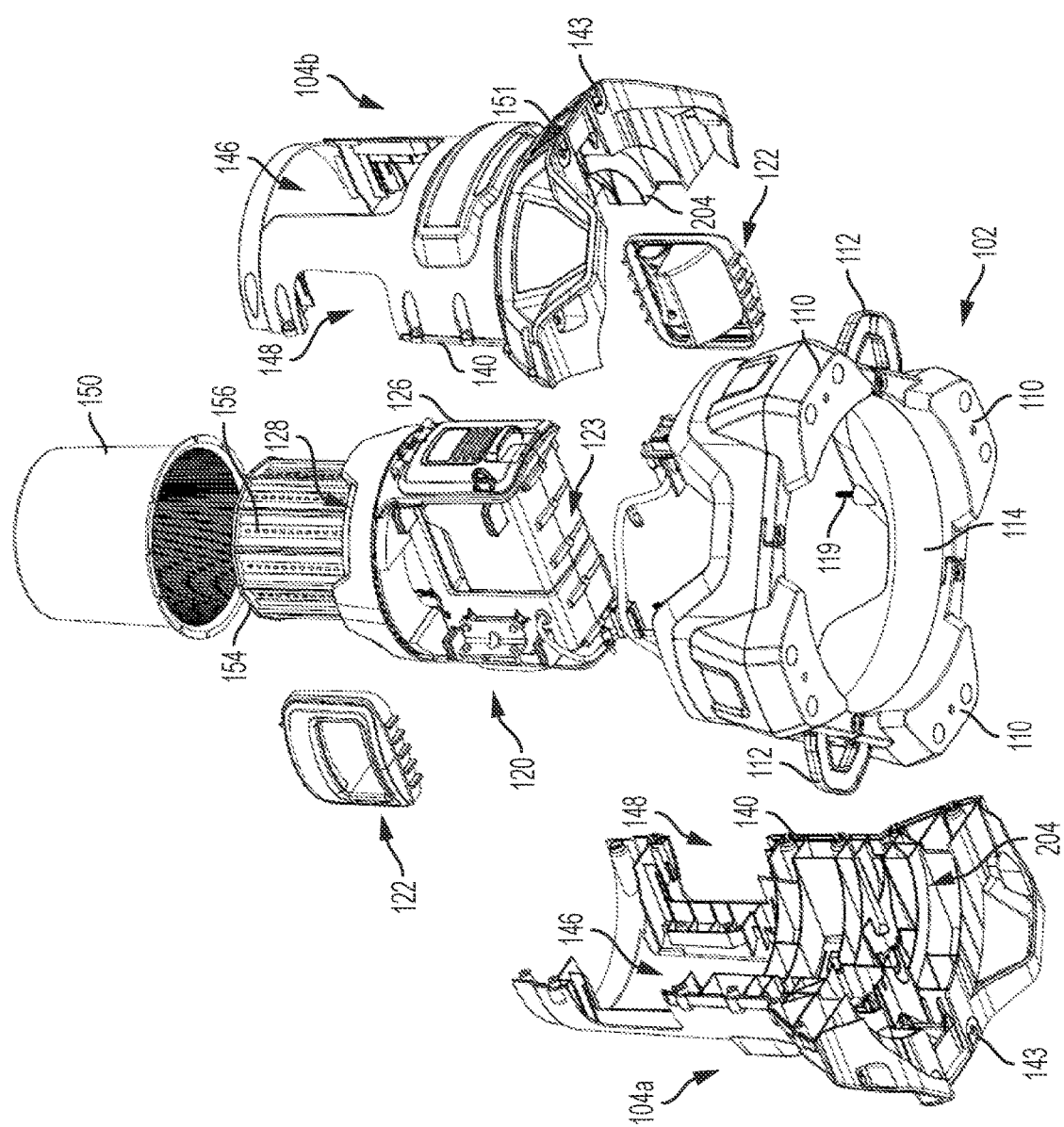

FIGS. 1 and 2 depict front and rear perspective views of a work light 100 including a base portion 102, a main portion 104, and a light module 106, according to an embodiment. FIGS. 3A and 3B depicts front and rear exploded view of the same work light 100, according to an embodiment. A detailed description of the work light 100 is provided herein with reference to these figures.

In an embodiment, base portion 102 includes a generally cylindrical body 114 defining a large opening and having four legs 110. Two hooks 112 may be additionally provided circumferentially on the base body 114 between adjacent lets 110, in an embodiment. In an embodiment, a top surface 116 of the base portion 102 includes a non-planar profile including curved portions 118 on top of the legs 110 and provides a mounting surface for the main portion 104, as described below. In an embodiment, the top surface 116 may additionally include upwardly-projecting posts or pins 119 for securing the main portion 104, as described below.

In an embodiment, main portion 104 includes a main body 120 and two housing halves 104a, 104b mated together partially around the main body 120.

In an embodiment, main body 120 includes a generally-cylindrical upper portion 128 having a smaller diameter than the body 114 of the base portion 102. The upper portion 128 of the main body 120 provides a mount and support structure for the light module 106. Main body 120 additionally includes a control housing portion 123 for housing a control circuit used to control the operation of the light module 106, as described later in detail.

In an embodiment, two oppositely-arranged handles 122 having gripping surfaces for the users to be able to lift the work light 100 are arranged circumferentially on two sides of the main body 120. The handles 122 are supported by the housing halves 104a, 104b, as described below. Main body 120 includes a keypad 124 arranged on one side between the handles 122 and a battery receptacle 126 arranged opposite the keypad 124. In an embodiment, battery receptacle 126 may be provided with a removable door and a locking mechanism for the door so that the battery receptacle is covered when it is not being used.

In an embodiment, work light 100 is additionally provided with a pair of male and female AC plugs 130 and 132. The male AC plug 130 may be coupled to an AC power source (e.g., AC mains or a power generator) for supplying AC power to the work light 100. Female AC plug 132 receives electric power from the male AC plug 130, thus allowing multiple work lights 100 to be daisy chained together in sequence. This arrangement allow multiple work lights 100 to be powered via the same AC power source throughout the work site.

In an embodiment, the control circuit housed in the control housing portion 123 of the main body 120 is electrically connected to the battery receptacle 126, the AC plug 130, the keypad 124, and the light module 106. The control circuit supplies power optionally from the male AC plug 130 or the battery receptacle 126 to the light module 106 based on the control options selected by the user via the keypad 124.

In an embodiment, the control circuit may be configured to supply electric power from the battery receptacle 126 (i.e., 20V Max DC power) as long as voltage is not detected from the AC plug 130. Once voltage is detected on the AC plug 130, the light module 106 is no longer powered from the battery receptacle 126. The switching mechanism (not shown) for the AC and battery power supplies may be, for example, a relay or other current-carrying switch.

In an embodiment, the control circuit may additionally include an AC-to-DC converter and/or an adaptor circuit to covert AC power from the AC plug 130 to DC power (e.g., 20V DC, or to a higher voltage level, e.g., 60V DC) suitable for the light module 106. In an embodiment, the control circuit may also be provided with a charging unit (not shown) that charges a battery received in the battery receptacle 126 when AC power is supplied via the AC plug 130.

A user may control the operation of the light module 106 (i.e., light dimming or other light setting) via keypad 124. In an embodiment, keypad 124 may include multiple illumination modes for the user to select from. The illumination modes correspond to the amount of power received from the power supply and provide illumination within predetermined lumen ranges. In an embodiment, three illumination modes (e.g., left, right, both) may be provided for each of the power supply modes. The keypad 124 may additionally include up and down buttons for the user to increase or decrease the amount of illumination (i.e., light intensity) in each mode.

A Bluetooth receiver/transmitter may further be provided and coupled to the control circuit, as described later, allowing an operator to control the operation of the light module 106 remotely via a smart phone or similar electronic device.

In an embodiment, the housing halves 104a, 104b each include a mating surface 140 that mate together around the control housing portion 123 of the main body 120 via a plurality of fasteners 105. A lower surface 142 of the housing halves 104a, 104b rests on top of the top portion 116 of the base portion 102. The lower surface 142 of the housing halves 104a, 104b may include a corresponding profile as the top portion 116 of the base portion 102. The lower surface 142 may further include pin receptacles 143 that receive posts 119 of the top portion 116 to secure the housing halves 104a, 104b to the base portion 102. The housing halves 104a, 104b, when mated together, hold the main body 120 at a distance above the base portion 102.

In an embodiment, housing halves 104a, 104b include oppositely-formed openings 146 that allow access to the keypad 124 and battery receptacle 126. Housing halves 104a, 104b also include side openings 148 that mate together around the handles 122 and circumferentially support the handles 122 around the main body 120. Housing halves further include two openings 150, 151 near the lower surface 142 where male plug 130 and female plug 132 are situated.

In an embodiment, light module 106 includes a generally cylindrical transparent (e.g., plastic) cover 150 disposed around a generally-cylindrical heat sink 152 mounted on the top portion 128 of the main body 120. A series of vertically-elongated printed circuit boards (PCBs) 156 are arranged on an outer circumference 154 of the heat sink 152. Each PCB 156 includes a series of light-emitting devices (LEDs) 158 mounted thereon. PCBs 156 provided a full 360 degrees of illumination around the work light 100. In an additional embodiment, a disc-shaped PCB (not shown) with LEDs may be mounted on a top surface of the heat sink 152 to provide additional illumination in a vertical direction. Heat sink 152 dissipates heat away from the LEDs 158.

In an alternative embodiment, particularly in lower-luminance applications where the LEDs do not generate substantial heat, light module 106 may include a single disc-shaped LED PCB mounted on the top portion 128 of the main body 120 without a heat sink. The light module 106 in this embodiment may include a dome-shaped deflector cover 150 to deflect and distribute light all around the work light 100.

There are many conventional design approaches for placing light devices above the floor or ground level. These include tripod stands or large footprint plastic housing designs. These types of devices present storage and transportability issues, and an overall concern for jobsite robustness. To address these problems for the jobsite, in an embodiment of the invention, work light 100 of this disclosure is designed such that a user is able to stack multiple works lights on top of one another safely and securely. This design substantially improves storage and transportability of the work lights 100, allowing multiple work lights 100 to be moved in, out, and around the jobsite simultaneously.

Figure 4:
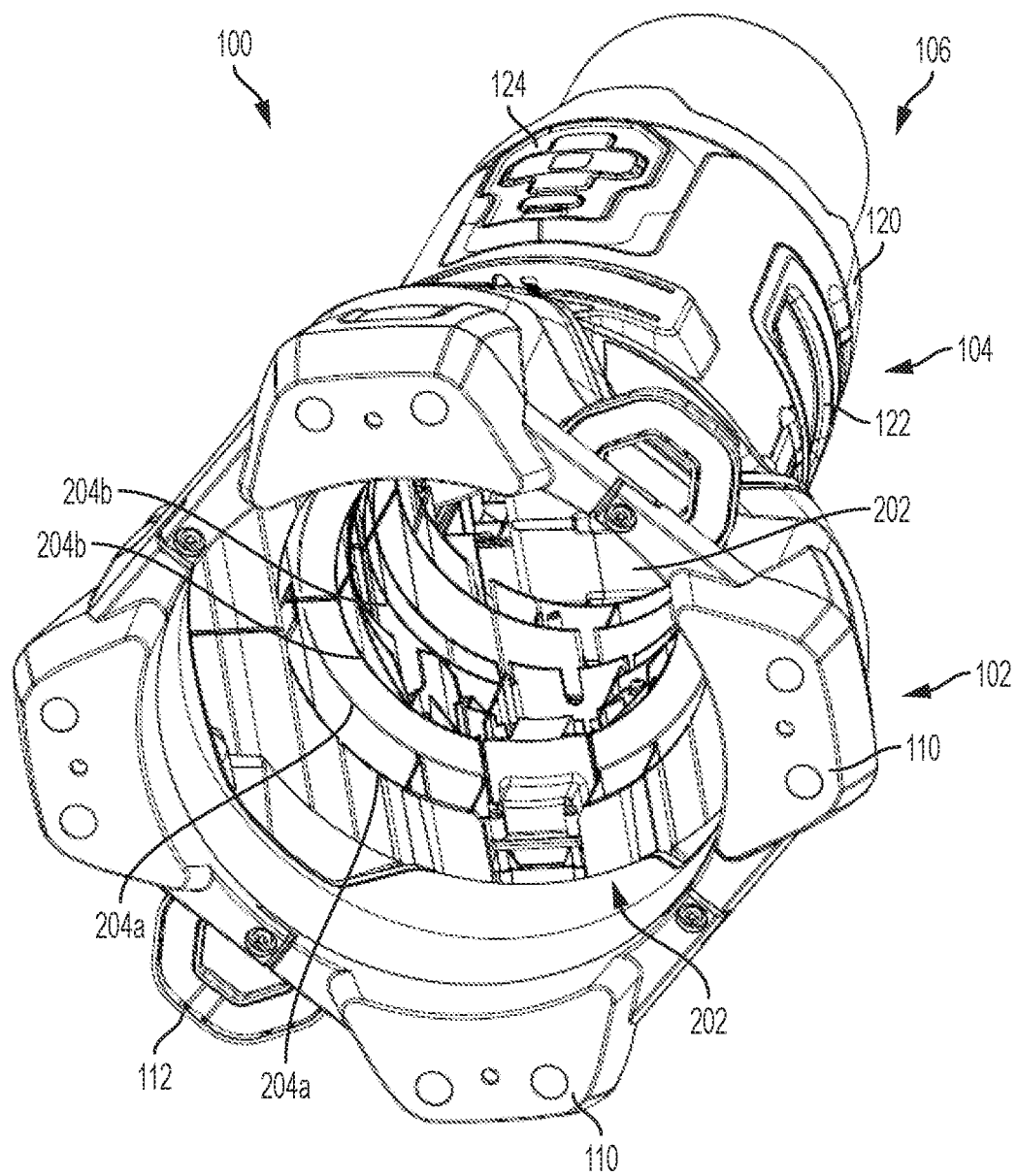
FIG. 4 depicts bottom perspective view of the work light, according to an embodiment.
Figure 5:
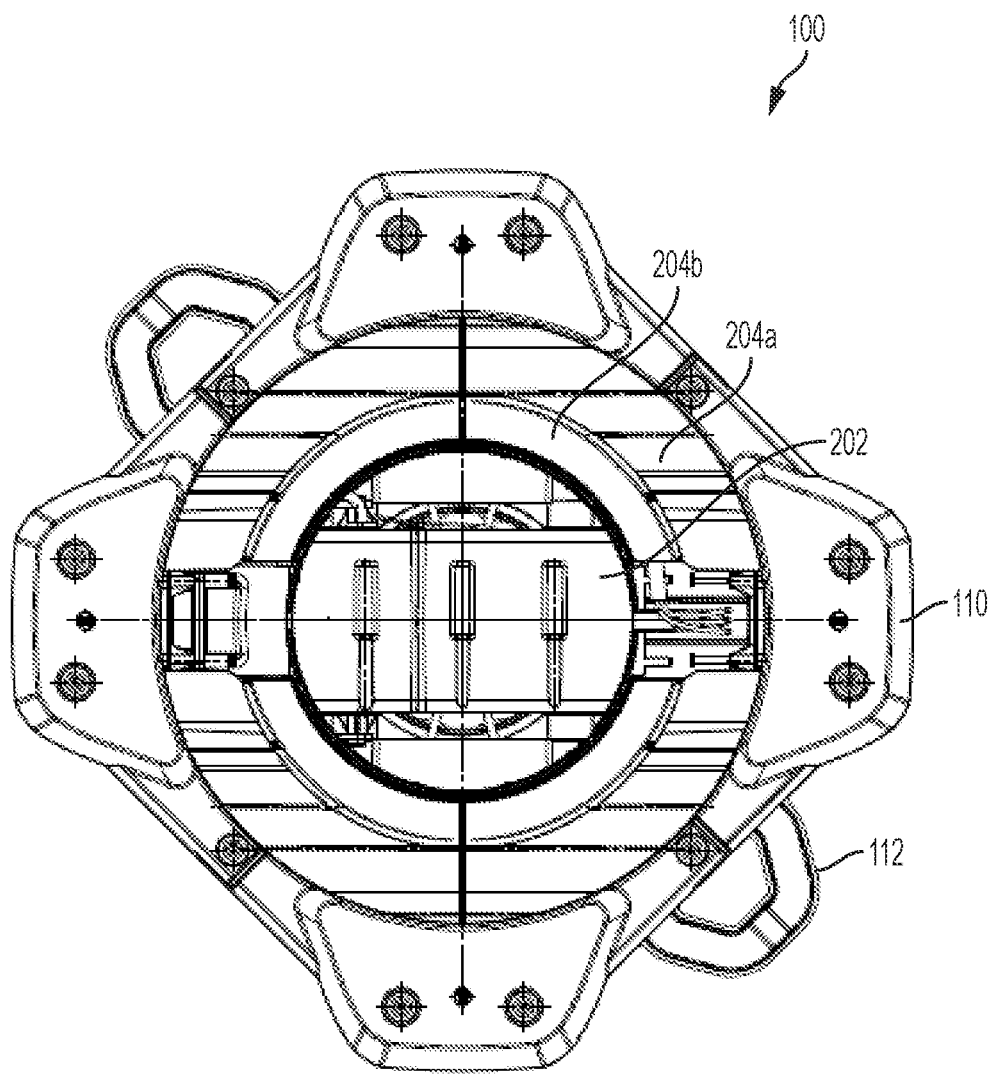
FIG. 5 depicts a bottom axial view work light, according to an embodiment.
Figure 6A:
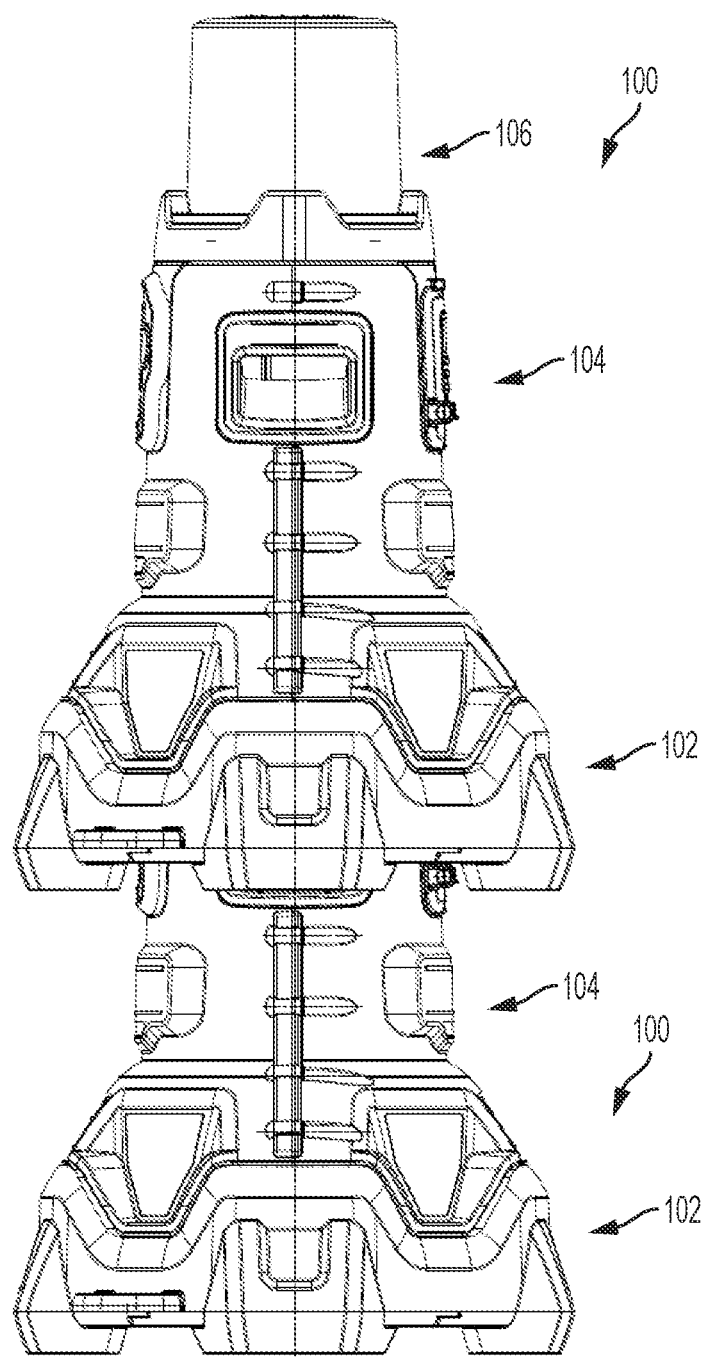
FIGS. 6A and 6B depict side and cross-sectional views of two stacked work lights, according to an embodiment.
Figure 6B:
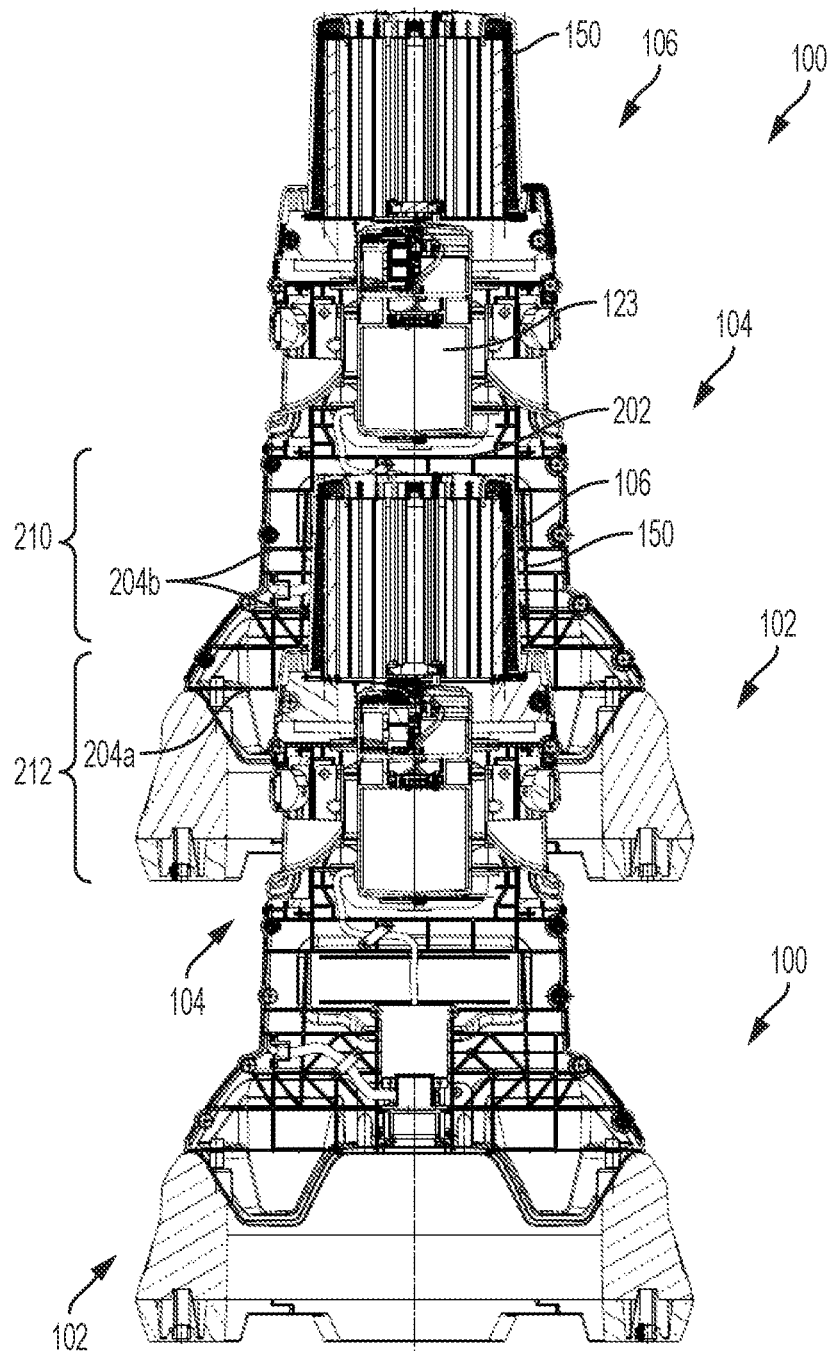

FIGS. 4 and 5 depict perspective and axial views of an underside of the work light 100, according to an embodiment. FIGS. 6A and 6B depict side and cross-sectional views of two work lights 100 in a stacked position, respectively. Features of the work light 100 related to its stackability are described herein with reference to these figures, and with continued reference to FIGS. 3A and 3B.

In an embodiment, each work light 100 includes a vertical (axial) opening 200 defined between the housing halves 104a and 104, extending longitudinally from the large opening of the base portion 102 previously discussed, to an underside 202 of the control housing portion 123 of the main body 120.

In an embodiment, housing halves 104a and 104b include spaced-apart radial ribs 204 projecting inwardly from an inner surface thereof. When housing halves 104a and 104b are mated together, radial ribs 204 define spaced-apart annular rings forming openings that together define opening 200 in a longitudinal direction. In an embodiment, ribs 204 are sized to allow vertical opening 200 to receive the light module 106 of another work light 100 therein. This arrangement allows multiple work lights 100 to be stacked on top of one another.

In an embodiment, one or more of the lower ribs 204a are sized to widen a lower portion of the opening 200, such that when two work lights 100 are stacked, lower ribs 204a of the upper work light 100 are disposed around an outer circumference of the top portion 128 of the main body 120 of the lower work light 100. In this position, a top surface 127 of the top portion 128 of the main body 120 engages a lower surface of rib 204b disposed above the lower ribs 204a. A top surface 127 of the top portion 128 of the main body 120 of the lower work light 100 provides a resting surface for the upper work light 100.

In this manner, according to an embodiment, opening 200 includes a first cylindrical compartment 210 sized to receive a light module 106 of a lower work light 100, and a second cylindrical compartment 212 formed in the base portion 102 having a larger diameter to receive at least a portion of the main body 120 of a lower work light 100.

Another aspect of the invention is described herein with reference to FIGS. 7-10.

US Patent Publication No. 2014/0107853 filed Mar. 15, 2014, which is incorporated herein by reference in its entirety, describes a system including a computing device, such as a personal computer, tablet, etc., in communication with power tools, battery packs, chargers, etc. via a wireless communication system such as Bluetooth, Wi-Fi, RF, etc. This system is employed, according to an embodiment of the invention, to enable wireless connectivity and control of the above-described work light 100 via a computing device, as described herein.

Figure 7:
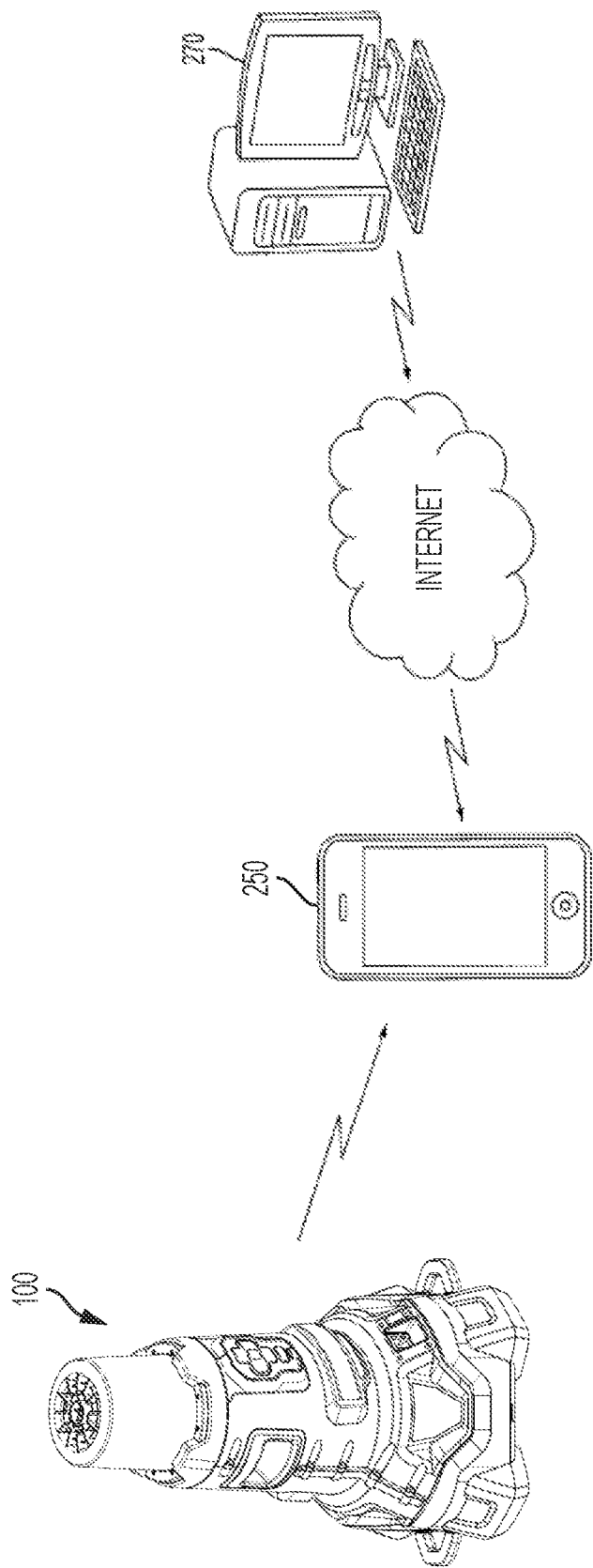
FIG. 7 depicts a network diagram of a work light connected to a computing device, according to an embodiment.

In an embodiment, as shown in FIG. 7, a computing device 250, such as a personal computer, tablet, mobile telephone, smartphone, etc. is provided. Computing device 250 is preferably connectable to a server 270 via the Internet. Persons skilled in the art will recognize that computing device 250 preferably connects to the Internet via a wireless communication circuit/protocol, such as Wi-Fi, Bluetooth, Zigbee, 3G/4G data systems, etc.

In an embodiment, computing device 250 may be coupled to a variety of rotator or non-rotary power tools, battery packs, battery chargers, etc. via a wireless connection, as described in U.S. Patent Publication No. 2014/0107853, U.S. Patent Publication No. 2014/0367134, and PCT Publication No. WO 2013/116303, each of which is incorporated herein by reference in its entirety. Additionally, computing device 250 may be coupled to work light 100 via a wireless communication unit 300, described in FIG. 8 below. Computing device 250 may include an application or program, as shown in FIGS. 9A and 9B, that implements the steps shown in the flow chart of FIG. 10 below for controlling various operation of the work light 100.

Figure 8:
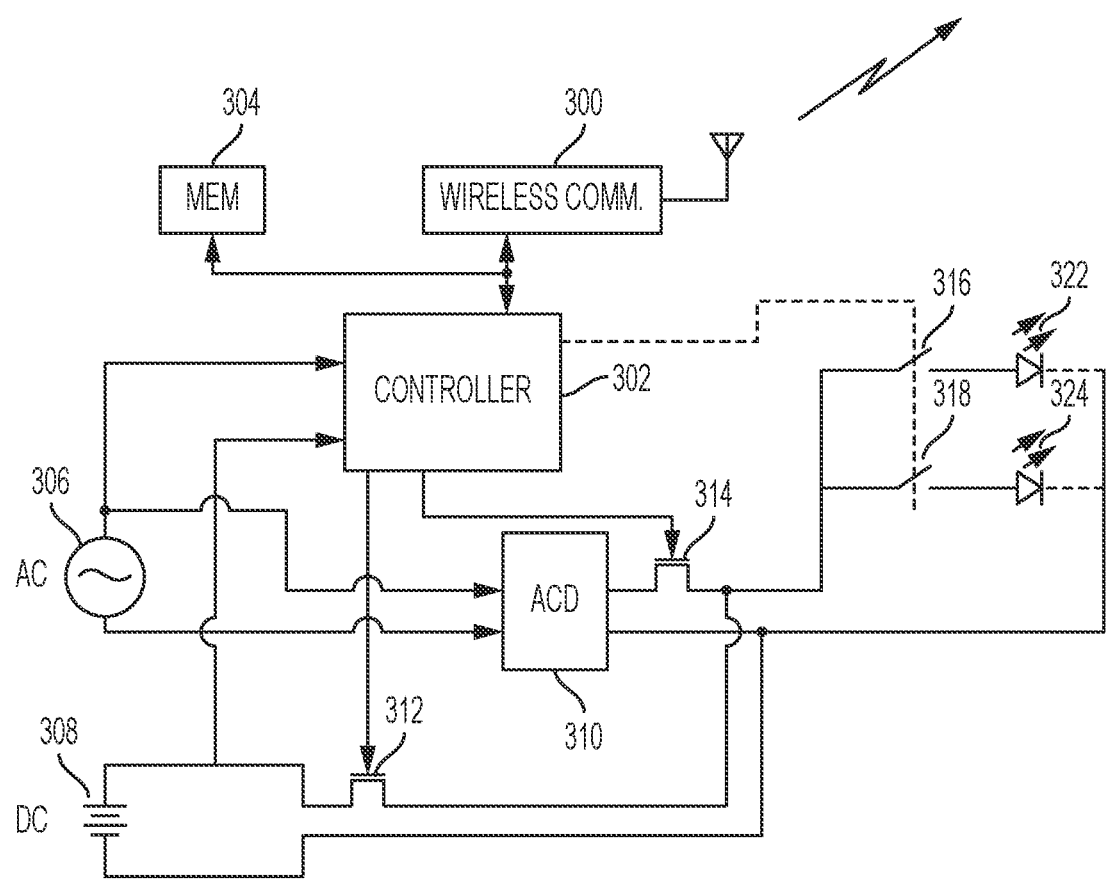
FIG. 8 depicts a block system diagram of the work light, according to an embodiment.

FIG. 8 depicts a block system diagram of the electronic circuitry within work light 100. As shown in this figure, work light 100 includes a wireless communication circuit, such as Wi-Fi, Bluetooth, Zigbee, infrared, RF, etc., coupled to a controller 302. Controller 302 may be a programmable chip, such as a micro-controller or micro-processor, or an integrated circuit (i.e., ASIC) chip configured to execute the processes described in this disclosure. Also coupled to controller 302 is memory 304, which stores certain data (e.g., identifier for the work light 100, and executable code for controller 302) accessible by the controller 302.

As described above, work light 100 may be powered by either an AC power source 306 via AC plug 130, or a DC power source 308 via battery receptacle 126. In an embodiment, an AC-to-DC converter 310 (e.g., an adaptor circuit including a bridge rectifier and a capacitor) may be provided to obtain DC voltage from the AC power source 306. In an embodiment, two electronic switches (e.g., FETs) 312, 314 are provided on the DC and AC power lines. These switches are used by the controller 302 to supply power from one of the AC power supply 306 or DC power supply 308. Controller 302 makes this decision based on detection of voltage on the AC power line. In addition, in an embodiment, controller 302 may control a switching operation of the switches 312, 314 to control the amount of lamination via, e.g., a pulse-width modulation (PWM) control or other known method.

In an embodiment, work light 100 provides a user the ability to select a mode of operation for turning on only the left half of the light module 106, the right half of the light module, or the full 360 degree area of the light module 106. This control may be implemented, in an embodiment via switches 316 and 318, which are controllable by the controller 302, and are coupled to the right LEDs 322 and left LEDs 324. Controller 302 selectively turns one or both switches 316 and 318 ON to turn the left half, the right half, or the full light module 106.

The user may control the described above features (i.e., light dimming, and mode of operation) using keys on keypad 124, as described above. Alternatively, in an embodiment, the user may use a computing device 250 to control these features, as described herein.

FIGS. 9A and 9B depict exemplary interfaces 400, 420, provided via an app or a program on computing device 250 accessible by the user. When the user starts the app, the user is provided with a list of all work lights that the device 250 is connected on interface 400. The user may turn all the lights ON or OFF, and/or enable or disable all the lights, via this interface 400. The user may also select one light (e.g., Light 1), in which case the user is provided with a second interface 420. In this screen the user may view work light attributes such as battery light, usage, identity, etc. The user may also select a mode of operation (i.e., right, left, or both), and increase or decrease light intensity. The user may further be provided with the ability to program a schedule for the work light. The schedule may include, for example, when the light turns on and off (e.g., every day at 6 pm to 10 pm), the light intensity level, mode, etc.

Figure 10:
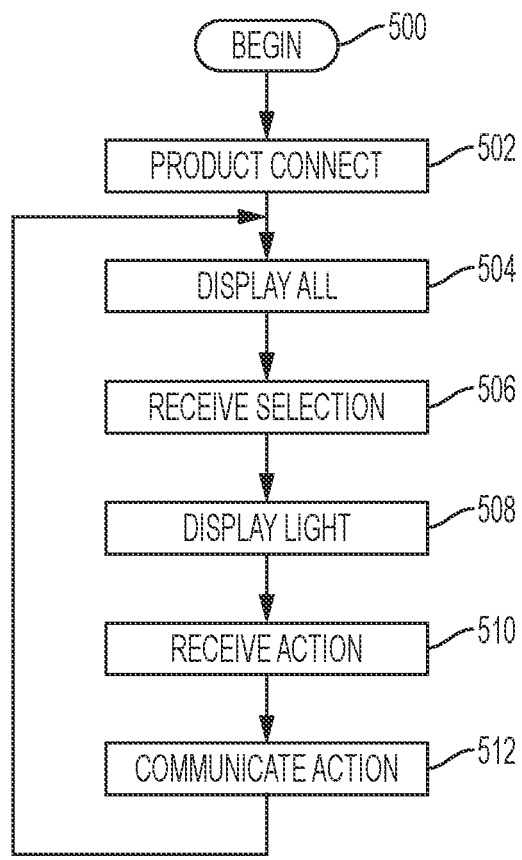
FIG. 10 depicts a flow chart diagram executed by the computing device, according to an embodiment.

FIG. 10 depicts an exemplary simplified flow diagram used by computing device 250 app or program to control the operation of a work light 100. In this flow diagram, computing device 250 connects wirelessly to wireless communication units 300 of various work lights 100 (at 502). The app provides the user with a display interface 400 of all available work lights 100 (at 504). It is noted that the app may also provide the user with a list of all other connected devices such as chargers, battery packs, power tools, etc. It is also noted that the app may provide this display in the form of categories of connected products.

At 506, the app receives a selection of a particular work light 100 from the user. Then at 508, the app displays interface 420 particular to that work light 100 to the user. The app then receives an action (e.g., change light intensity, enable, disable, mode, etc.) from the user (at 510). The app then proceeds to communicate that action to the work light 100 controller 302 via wireless communication unit 300.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An area light comprising:
a body having a body first end and a body second end opposite the body first end;
a cover extending from the body first end, the cover having a cover first end at the body first end and a cover second end opposite the cover first end;
a light module disposed on the body first end, the light module comprising a heat sink and light emitting diodes (LEDs) arranged around the heat sink, the LEDs configured to emit light through the cover and in a direction that extends 360 degrees around a center axis of the area light;
a battery receptacle on the body, the battery receptacle configured to receive a removable battery pack configured to supply electric power to the LEDs and including a door movable into a position covering the battery receptacle;
wherein the cover comprises a first portion around the light module and a second portion extending from the first portion at the cover second end in a direction substantially perpendicular to the center axis;
wherein the first portion of the cover has at least one outer surface that is substantially smooth in a direction from the cover first end to the cover second end;
wherein the first portion of the cover is spaced from the LEDs such that the LEDs emit light directly though the first portion;
wherein the cover comprises a plastic material;
wherein the at least one outer surface extends at least a majority of a length of the cover extending from the cover first end to the cover second end; and
wherein the area light is portable.

2. The area light of claim 1, wherein the first portion of the cover gradually tapers from the cover first end to the cover second end.

3. The area light of claim 2, further comprising user-operable controls on the body configured to allow a user to control the area light.

4. The are light of claim 1, wherein the body first end has a plurality of peaks and a plurality of valleys about a circumference of the body first end.

5. The area light of claim 1, wherein the area light is configured to be stacked on a second area light of the same construction.

6. An area light comprising:
a body having a main body portion and a base portion coupled to the main body portion;
a light module disposed on a first end of the main body portion, the light module comprising:
 a heat sink,
 a plurality of printed circuit boards arranged in spaced series about a periphery of the heat sink,
 a plurality of light emitting diodes (LEDs) positioned in spaced series along each of the printed circuit boards,
 a cover received over the heat sink, printed circuit boards and the LEDs, the cover comprising a substantially transparent material, and
 wherein the LEDs are configured to emit light directly though the cover and in a direction that extends 360 degrees around a center axis of the area light;
at least one handle located along the main body portion; and
a battery receptacle located along the body, the battery receptacle configured to receive at least one removable battery pack configured to supply electric power to the LEDs;
wherein the area light is portable; and
wherein the base portion comprises a base body, a first leg, a second leg, and a third leg, and an open area defined between the first leg, the second leg and the third legs and configured to receive at least part of a light module of a second area light therein.

7. The area light of claim 6, wherein the main portion comprises a control housing portion configured to house a control circuit that controls operation of the light module.

8. The area light of claim 6, wherein the base portion comprises a top surface having a substantially non-planar profile.

9. The area light of claim 6, further comprising one or more of a male AC plug and a female AC plug.

10. The area light of claim 6, wherein a first portion of the cover gradually tapers from a cover first end to a cover second end.

11. The area light of claim 6, wherein the cover comprises a plastic material.

12. The area light of claim 6, wherein the first end of the body includes at least one peak and at least one valley about a circumference of the first end.

13. The area light of claim 6, wherein the area light is also configured to emit light in a direction parallel to the center axis.

14. The area light of claim 6, wherein the light emitting diodes (LEDs) on each of the printed circuit boards comprises at least seven LEDs on each of the printed circuit boards.

15. An area light comprising:
a body having a body first end and a body second end opposite the body first end;
a light module disposed on the body first end, the light module comprising a heat sink, printed circuit boards arranged around the heat sink, and a plurality of light emitting diodes (LEDs) spaced along each of the printed circuit boards,
wherein the printed circuit boards are arranged around a center axis of the area light and extend in a direction substantially parallel to the center axis;
a cover positioned adjacent the LEDs
wherein the LEDs configured to emit light though the cover and in a direction that extends approximately 360 degrees around a center axis of the area light;
a battery receptacle on the body, the battery receptacle configured to receive at least one removable battery pack configured to supply electric power to the LEDs, and including an opening through which the at least one removable battery pack is received and a door configured to cover the opening; and
wherein the area light is configured to be portable and stackable on a second area light of a same construction.

16. The area light of claim 15, wherein the cover operates as a light diffuser.

17. The area light of claim 15, wherein the heat sink is configured to dissipate heat in a direction away from the LEDs.

18. The area light of claim 15, wherein the heat sink comprises a substantially hollow tube.

19. The area light of claim 16 wherein the main portion comprises a control housing portion configured to house a control circuit that controls operation of the light module.

20. The area light of claim 15, wherein the body first end includes at least one peak and at least one valley about a circumference of the body first end; and wherein the at least one peak has a peak upper end; wherein the at least one valley has a valley upper end; wherein the peak upper end is higher than the valley upper end; and wherein the at least one peak and at least one valley are visible from outside the area light.

* * * * *